United States Patent [19]

Pindera

[11] Patent Number: 4,703,918

[45] Date of Patent: Nov. 3, 1987

[54] APPARATUS FOR DETERMINATION OF ELASTIC ISODYNES AND OF THE GENERAL STATE OF BIREFRINGENCE WHOLE FIELD-WISE USING THE DEVICE FOR BIREFRINGENCE MEASUREMENTS IN A SCANNING MODE (ISODYNE POLARISCOPE)

[76] Inventor: Jerzy T. Pindera, 310 Grant Crescent, Waterloo, Ontario, Canada, N2K 2A2

[21] Appl. No.: 397,922

[22] Filed: Jul. 12, 1982

[51] Int. Cl.[4] .......................... G01L 1/24; G01N 21/21
[52] U.S. Cl. .......................................... 356/35; 73/800
[58] Field of Search ............... 356/32, 33, 35; 73/800

[56] References Cited

PUBLICATIONS

Pindera et al., "Studies of Contact Problems Using Photoelastic Isodynes", *Experimental Mechanics*, vol. 21, No. 12, pp. 448-456, 12/81.

Mazurkiewicz et al., "Integrated-plane Photoelastic Method-Application of Photoelastic Isodynes", *Experimental Mechanics*, vol. 19, No. 7, pp. 225-234, Jul. 1979.

*Primary Examiner*—F. L. Evans
*Assistant Examiner*—Matthew W. Koren

[57] ABSTRACT

An apparatus has been developed to experimentally determine the state and amount of birefringence in an arbitrary plane within a birefringent body using an entirely new method. Such information can be used to determine the optical anisotropy in solid and liquid bodies, residual and induced stress fields, etc. This apparatus uses a collimated and polarized light beam which scans linearly the plane of measurement within a transparent birefringent or photoelastic object, and a device which collects particular sheets of light scattered along the path of the light beam, the intensity of which is directly related to the state of birefringence at each scattering point at the plane of measurement within the birefringent body. An imaging device produces in the image plane of the apparatus the lines of constant light intensities which are the lines of constant values of accumulated birefringence. For plane stress states in engineering objects such lines are identical with the elastic isodynes and are therefore called photoelastic isodynes. Two independent fields of such isodynes allow the direct determination of all three stress components of the plane stress state and give an additional relation between the strees components. This is the only experimental method which supplies directly four or more independent data on the stress state at each point within the photoelastic object.

8 Claims, 4 Drawing Figures

APPARATUS FOR DETERMINATION OF ELASTIC ISODYNES AND OF THE GENERAL STATE OF BIREFRINGENCE WHOLE FIELD-WISE USING THE DEVICE FOR BIREFRINGENCE MEASUREMENTS IN A SCANNING MODE (ISODYNE POLARISCOPE)

BACKGROUND OF THE INVENTION

1. Field of the Invention

The invention relates to the apparatus which is useful for the rapid, accurate, self-correcting and theoretically correct measurements of the state of birefringence in selected planes within a birefringent body, and, in particular, to determine photoelastic isodynes in selected planes which carry information on the normal and shear stress components in the whole field.

The measurements are simple when the stress state is two-dimensional (plane).

While the apparatus has application for whole field measurements of a wide range of birefringence states in solid and liquid bodies, the following description is taken by way of example with respect to a measurement system for the determination of stress components in engineering objects, in particular, to the measurement system for the determination of components of plane stress states.

2. The Prior Art

The whole field measurements of plane stress fields usually utilize some characteristic lines of two-dimensional stress fields such as isochromatics (lines of constant values of maximal shear stresses), isoclinics (lines of constant directions of principal stresses), isopachics (lines of constant values of the sum of principal stresses), etc. For instance, transmission polariscope techniques supply fields of isochromatics and isoclinics; that is, they supply two independent pieces of information when three independent data on stress components are needed to determine a plane stress state. To determine all three stress components at all points of a plane stress state using the transmission photoelasticity techniques it is necessary to apply additional relations which decrease the reliability and accuracy of calculated values of stresses.

The sometimes used scattered light technique based on photographic recording of light scattered from the points within a body illuminated by a stationary sheet of light is theoretically and practically inaccurate: the observation and azimuthal angles of the scattered light change from point to point, and the angle between the object plane and the image plane is close to 45° instead of being close to zero.

OBJECT OF THE INVENTION

It is the aim of this invention to provide a new apparatus for measuring the state and amount of optical birefringence in optically anisotropic bodies, in particular, for determining the fields of photoelastic isodynes in selected planes of photoelastic objects. This apparatus utilizes the concept of elastic isodynes introduced by J. T. Pindera in 1980–1981 to determine all components of the plane and semi-plane stress states such as the stress components in the regions of cracks of interest in fracture mechanics, the interlaminar stress components in composite structures, the velocity vector fields in liquids, the residual stress states, and the thermal stress states.

Other objects of the invention will be apparent from the following description taken in connection with the accompanying drawings.

STATEMENT OF THE INVENTION

In accordance with the current invention as described in FIG. 1, I provide: (1) a source of radiant energy with frequencies in the range from visible to microwave—most preferably a laser—to produce a single, narrow beam of collimated light, called a primary light beam, including a means to circularly or linearly polarize the said primary light beam, and to adjust its plane of vibration, if applicable; (2) means to direct the said primary light beam into a birefringent body, solid or liquid, which internally scatters the said polarized primary light beam as it propagates along a chosen line of measurement and modulates the intensity of the light scattered at each point along the line of measurement; (3) means for selecting, collecting and collimating three particular sheets of light scattered along the said primary polarized light beam which are scattered under the same azimuthal angle, which are called the primary scattered light sheets and which are composed of the light beams scattered under the same azimuthal angles at each point at the line of measurement along which the polarized primary light beam propagates; (4) means for isolation of a single primary sheet of scattered light from the said three collimated scattered light sheets; (5) means for coupling the said means (3) and (4) with the line of propagation of the said primary polarized light beam, which assures that the said primary polarized light beam and the means (3) and (4) are displaced simultaneously in the plane of measurement; (6) means for displacing, continuously or stepwise, the said primary polarized light beam together with the means (3), (4) and (5) in the direction normal to the said line of measurement and parallel to the face of the birefringent body, which allows linear scanning in the plane of measurement, and in the direction normal to the said measurement plane; (7) means for selection of secondary sheets of scattered light from the said primary sheets of scattered light where the secondary light sheets only consist of originally parallel light beams scattered under the same azimuthal angles in a direction normal to the line of measurement, which carry the pertinent information on the state of birefringence along the line of measurement; (8) means for optical noise reduction in the said secondary light sheets; (9) means for producing images of the distribution of the scattered light intensities in the said selected planes of measurement within the said birefringent body using any of the said secondary sheets of scattered light; (10) means for recording and analyzing the patterns of the light intensity distribution produced in the image plane by the selected, information-carrying scattered light sheet.

THE DRAWINGS

In the drawings:

FIG. 1 is a block schematics of the apparatus called isodyne polariscope.

FIG. 2 gives relations between the elastic isodynes and the normal and shear stress components, which is the theoretical foundation of the isodyne polariscope when used as a measurement system for experimental stress analysis.

DETAILED DESCRIPTION OF THE INVENTION

1. Theory of the Invention

Figure 2:
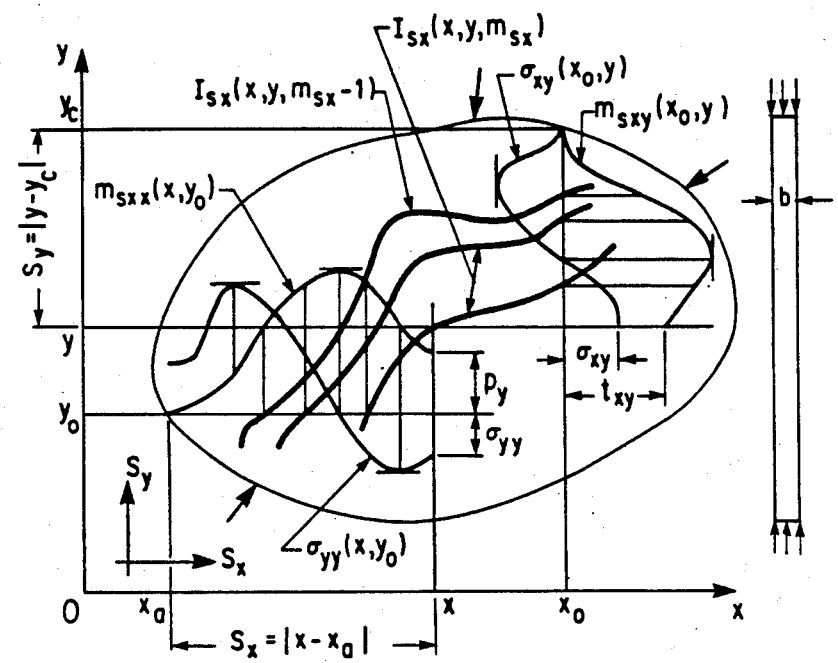

1a. Isodynes as Functions Related to the First Derivatives of Airy Stress Function:

A homogeneous and isotropic flat plate of a uniform thickness b is considered, the surface of which is coplanar with the plane (x,y), FIG. 2. The plate is of such a geometry and is loaded in such a manner that the stress state in the plate is two-dimensional and does not depend on the plate thickness. Obviously, such a condition, for instance, restricts the values of the thickness b and the maximal radius of curvature of boundary $\rho_m$ in such a manner that the relation $$b/\rho_m << 1 \tag{1}$$

is satisfied, and requires that the strain gradients in the plane (x,y) are negligible, otherwise the stress components normal to the face of the plate cannot be neglected. Consequently, it is assumed in the theory of thin plates loaded by the forces normal to the boundary that the stress components do not depend on the coordinate z normal to the plate face regardless of the geometry of the boundary and regardless of the values of the strain gradients. The stress state in such a mathematical model of a hypothetical plate is conveniently characterised by Airy stress function $\phi(x,y)$ which—in the absence of body forces—yields the known expressions for the stress components with respect to a Cartesian coordinate system (x,y,z):

$$\frac{\partial \phi(x,y)}{\partial x} = \phi_x(x,y); \quad \frac{\partial \phi(x,y)}{\partial y} = \phi_y(x,y) \tag{2a}$$

$$\sigma_{xx} = \frac{\partial^2 \phi}{\partial y^2} = \frac{\partial}{\partial y} \phi_y; \quad \sigma_{yy} = \frac{\partial^2 \phi}{\partial x^2} = \frac{\partial}{\partial x} \phi_x \tag{2b}$$

$$\sigma_{xy} = \sigma_{yx} = -\frac{\partial^2 \phi}{\partial x \partial y} = -\frac{\partial}{\partial y} \phi_x = -\frac{\partial}{\partial x} \phi_y \tag{2c}$$

There exist particular relations between the stress components $\sigma_{ij}$, the intensities $p_i$ of normal forces acting on sections between isodynes, and the functions $\phi_x$, $\phi_y$:

$$\int \sigma_{yy} dx = \int \frac{\partial^2 \phi}{\partial x^2} dx = \phi_x + f_{xx}(y) = p_y(x,y_0) = S_s m_{sxx}(x,y_0) \tag{3a}$$

$$\int \sigma_{xx} dy = \int \frac{\partial^2 \phi}{\partial y^2} dy = \phi_y + f_{yy}(x) = P_x(x_0,y) = S_s m_{syy}(x_0,y) \tag{3b}$$

and $$\sigma_{yy} = \frac{\partial}{\partial x} \phi_x = \frac{d}{dx} P_y = S_s \frac{d}{dx} m_{sxx}(x,y_0) \tag{4a}$$

$$\sigma_{xx} = \frac{\partial}{\partial y} \phi_y = \frac{d}{dy} P_x = S_s \frac{d}{dy} m_{syy}(x_0,y) \tag{4b}$$

where $p_y$ and $p_x$ denote the intensities of normal forces acting on cross-sections collinear with the corresponding directions x and y, and $m_{sxx}$ and $m_{syy}$ denote cross-sections through x- and y-isodyne fields in the x- and y-directions. The following functions can be introduced:

$$I_{sx} = I_{sx}(x,y,m_{sx}) = \int \frac{\partial^2 \phi}{\partial x^2} dx = P_y(x,ym_{sx}) = S_s m_{sx}(x,y) = \text{const} \tag{5a}$$

$$I_{sy} = I_{sy}(x,y,m_{sy}) = \int \frac{\partial^2 \phi}{\partial y^2} dy = P_x(X,Y,M_{sy}) = S_s m_{sy}(x,y) = \text{const} \tag{5b}$$

The loci of points described by relations (5a) and (5b) can be called "elastic isodynes" because they represent lines of constant values of intensities of normal forces acting on corresponding cross-sections in a plane stress field. The arbitrary directions x and y to which elastic isodynes are related can be conveniently called "characteristic directions" $S_x$ and $S_y$.

The functions $\phi_x$ and $\phi_y$ could be called "plane generalized isodynes":

$$\phi_x(x,y,m_{sx}) = I_{sx}(x,y,m_{sx}) - f_{xx}(y) = \text{const} \tag{6a}$$

$$\phi_y(x,y,m_{sy}) = I_s(x,y,m_{sy}) - f_{yy}(x) = \text{const} \tag{6b}$$

The functions $f_{xx}(y)$ and $f_{yy}(x)$ can be determined from the boundary conditions. The generalized isodynes $\phi_x$ and $\phi_y$ are simply related to the corresponding isodyne fields characterized by the isodyne orders $m_{sx}$ and $m_{sy}$:

$$\phi_x = S_s m_{sx}(x,y) - f_{xx}(y) = \text{const} \tag{7a}$$

$$\phi_y = S_s m_{sy}(x,y) - f_{yy}(x) = \text{const} \tag{7b}$$

The relations (7a) and (7b) can be used to determine the shear stress components $\sigma_{xy}$ and $\sigma_{yx}$, and their intensities $t_{xy}$ and $t_{yx}$:

$$\sigma_{xy} = -\frac{\partial}{\partial y} \phi_x = -S_s \frac{\partial}{\partial y} m_{sx}(x,y) + \frac{\partial}{\partial y} f_{xx}(y) \tag{8a}$$

$$= -S_s \frac{d}{dy} m_{sxy}(x,y) + f'_{xx}(y) = \frac{d}{dy} t_{xy}(x,y)$$

$$\sigma_{yx} = -\frac{\partial}{\partial x} \phi_y = -S_s \frac{\partial}{\partial x} m_{sy}(x,y) + \frac{\partial}{\partial x} f_{yy}(x) \tag{8b}$$

$$= -S_s \frac{d}{dx} m_{syx}(x,y) + f'_{yy}(x) = \frac{d}{dx} t_{yx}(xy)$$

$$t_{xy} = t_{xy}(x,ym_{sxy}) = \int \sigma_{xy} dy = -\int \frac{\partial \phi_x}{\partial y} = \tag{9a}$$

$$-S_s m_{sxy}(x,y) + f_{xx}(y) + C_1$$

$$t_{yx} = t_{yx}(x,y,m_{syx}) = \int \sigma_{yx} dx = -\int \frac{\partial \phi_y}{\partial x} dx = \tag{9b}$$

$$-S_s m_{syx}(x,y) + f_{yy}(x) + C_2$$

Obviously, $$T_{xy} = bt_{xy},$$

and $$T_{yx} = bt_{yx} \tag{10a}$$

At any chosen point $\sigma_{xy} = \sigma_{yx}$, thus, $$S_s \left[ \frac{d}{dy} m_{sxy}(x,y) - \frac{d}{dx} m_{syx}(x,y) \right] = f_{xx}'(y) - f_{yy}'(x) \quad (11)$$

Relations (11) can be used to check the accuracy of the determination of the functions $f_{xx}'(y)$ and $f_{yy}'(x)$.

According to relations (4a,b) and (8a,b) two families of isodynes related to two different directions—preferably mutually perpendicular—for instance, the $I_{sx}(x,y)$ and $I_{sy}(x,y)$ or shortly the (x,y)-isodynes, yield four independent pieces of information on the values of the normal and shear stress components $$\sigma_{xx}, \sigma_{yy}, \sigma_{xy} \text{ and } \sigma_{yx}, \text{ where } \sigma_{xy} = \sigma_{yx} \quad (12)$$

In addition, the fields of (x,y)-isodynes are related by the condition $$\sigma_{xx} + \sigma_{yy} = \sigma_1 + \sigma_2 = \text{const} \quad (13)$$

Thus, the equation of isopachics $$\sigma_{xx} + \sigma_{yy} = F(x,y) = ks = \text{const} \quad (14)$$

where k is the order of isopachic and s is a constant, may be presented in the form:

$$\frac{\partial}{\partial x} \phi_x + \frac{\partial}{\partial y} \phi_y = \quad (15)$$

$$S_s \left( \frac{d}{dx} m_{sxx} + \frac{d}{dy} m_{syy} \right) = S_s m_i = \text{const}$$

where $m_i$ denotes the order of isopachics and $S_s$ denotes the elastic coefficient of isopachics.

When the boundary conditions are such that the functions $f_{xx}(y)$, $f_{yy}(x)$, $C_1$ and $C_2$ vanish, then the elastic and photoelastic isodynes are identical with the first derivatives of Airy stress function.

It is convenient to use the term "characteristic lines of plane stress fields" to denote a set of functions characterizing the stress fields such as the isostatics, isoclinics, isochromatics, isopachics, etc. Within such a framework the elastic isodynes represent a new family of characteristic lines of plane stress fields.

1b. Determination of Stress Components Using Elastic Isodynes:

These four independent pieces of information given by (x,y)-isodynes describe three independent stress components, $\sigma_{xx}, \sigma_{yy}, \sigma_{xy} = \sigma_{yx}$; one piece of information is redundant and can be used to increase the accuracy of experimental evaluation of stress components. Various known techniques of differentiation and integration of isodyne fields can be applied or adapted to determine the quantities of interest.

1c. Photoelastic Isodynes

It has been reported by Pindera and Mazurkiewicz that for the plane stress problems it is possible to obtain photoelastically a particular set of families of lines of constant scattered light intensities, each of which is related to an arbitrarily chosen direction, x or y, $$I_{sx} = I_{sx}(x,y,m_{sx}) = \text{const} \quad (16a)$$

$$I_{sy} = I_{sy}(x,y,m_{sy}) = \text{const} \quad (16b)$$

These isodensitometric lines were labelled "photoelastic isodynes" since they represent lines of constant values of total normal forces acting on cross-sections of a plate of a thickness b collinear with the chosen direction and bounded by two adjacent isodynes; in other words, the values of the total normal forces P acting on the characteristic sections Δs between two isodynes are constant.

It has been shown by J. T. Pindera that the photoelastic isodynes are identical with the elastic isodynes when certain conditions are satisfied. Thus, the photoelastic isodynes yield all the components of the plane stress fields in the same manner as the elastic isodynes.

1d. Evaluation of Airy Stress Function

When the boundary conditions are known, two isodyne fields related to two different characteristic directions are—in general—sufficient to numerically determine the stress function.

It appears that the isodyne photoelasticity is the only experimental method which supplies data sufficient to construct Airy stress function. In this approach Airy stress function represents a surface having particular properties such as: slopes of this surface in characteristic directions are proportional to the total normal forces acting on corresponding cross-sections through the object, and the curvatures are related to the stress components.

1e. Differential Isodynes

The theory of the elastic and photoelastic isodynes has been generalized by the introduction of the concept of the differential isodynes related to the local three-dimensional stress states in plates.

The differential isodynes in the case of stress fields in thick plates are defined as the lines of constant values of the difference of intensities of normal forces acting on corresponding cross-sections of the plate in directions co-planar with the middle plane of the plate and normal to it. For the x-characteristic direction, FIG. 2, the equation of a differential isodyne is $$p_{y,z}(x,y,z=z_i) = p_y - p_z = S_s m_{sx} = \text{const} \quad (17)$$

To utilize in practice the theory of differential isodynes, the pertinent measurement system must satisfy a set of particular conditions. The invented measurement system satisfies the said conditions.

2. Details of the Invention

While the disclosed technique has application for a wide range of radiation sources, a wide range of spectral frequencies, and a wide range of birefringent or photoelastic bodies, the following description is taken by way of example with respect to an optical measurement system using the electromagnetic radiation within the visible light band which is applied to measure stresses in plates. The term "radiant energy" as used herein includes all forms of energy which interact with the states of anisotropy and inhomogeneity produced by stresses and strains, or built-in, in the solid and liquid bodies such as electromagnetic energy, or sonic and ultrasonic energies.

Figure 1:
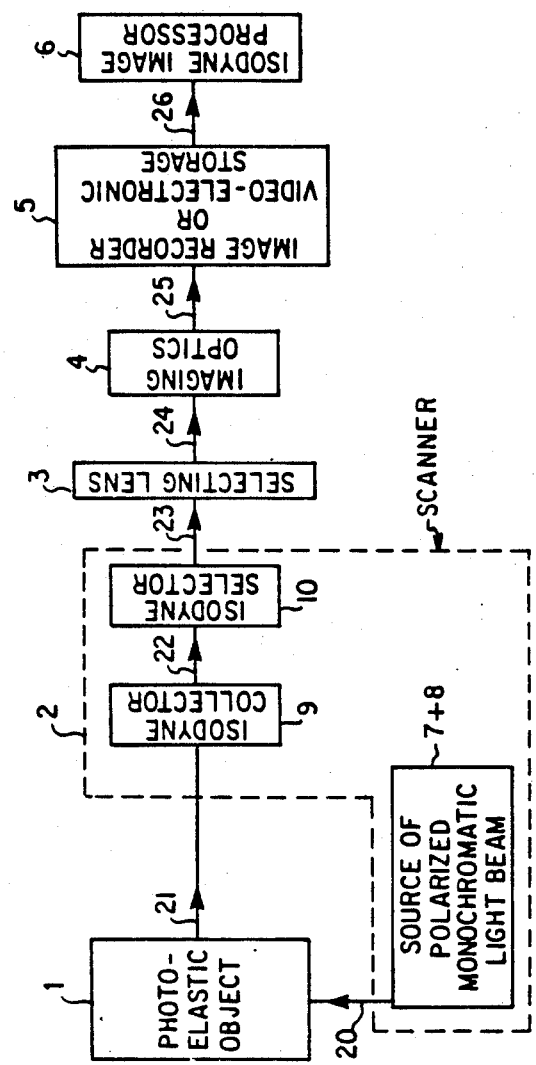
Figure 3:
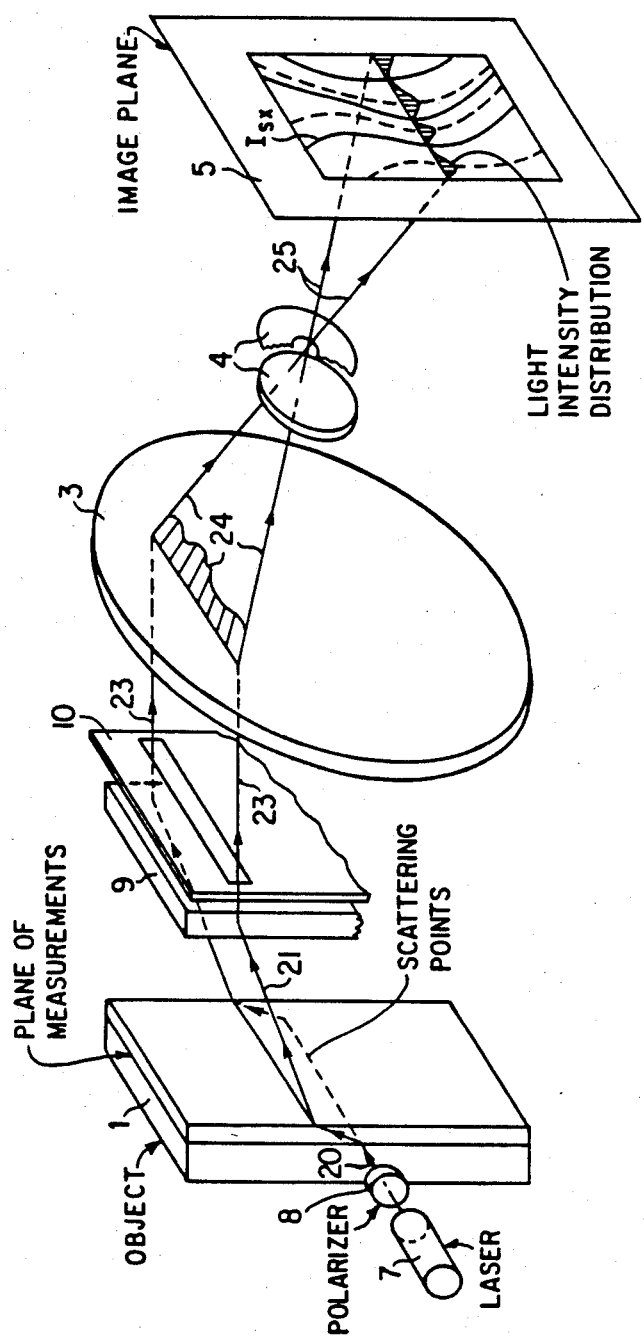
FIG. 3 is the functional scheme of the isodyne polariscope which shows the principle of the linear scanning technique of producing photoelastic isodynes for selected measurement planes within a birefringent or photoelastic object.

Referring to FIG. 1 and FIG. 3 of the drawings, a laser 7, together with polarizer 8, is a source of a narrow beam of monochromatic polarized light 20, called the primary light beam, the electric field vector of which can be rotated; the primary light beam 20 propagates through the photoelastic object, represented for simplicity by a plate, in a selected direction along a selected line of measurement within a selected plane of measurement, and is scattered in all directions at each point at the line of measurement; the intensity of the scattered light depends on the state of birefringence or on the stresses along the line of measurement and on the azimuthal and observation angles commonly referred to as parameters of Rayleigh model of scattering; three suitably chosen scattered light sheets 21 composed of light beams 21 scattered from the primary light beam under the same azimuthal angles at all points at the line of measurement, the light intensity distributions of which are directly related to the field of isodynes and, consequently, to the magnitude of stress components along the line of measurement given by the primary beam 20, are selected, collected and collimated by the isodyne collector 9 and produce the scattered light sheets 22; the isodyne selector 10 is used to allow only one scattered light sheet 23 to continue to propagate through the system; the light source 7, polarizer 8, isodyne collector 9, and isodyne selector 10 are connected mechanically or optically and constitute the scanner 2 which displaces linearly and continuously the primary light beam 20 within the selected plane of measurement which is coplanar with the surface of the plate 1, so that the scanner collects data on the isodyne field represented by the intensity of light scattered from the primary light beam at each point of the scanned plane of measurement; the selecting lens 3 eliminates from each of the scattered light sheets 23 transmitted by the isodyne selector 10 all the light beams which are not normal to the line of measurement along which the light beam 20 propagates, and produces the corresponding light sheets 24; the imaging optics 4, consisting of the imaging lens and a diaphragm, produces in the image plane of the recorder 5 the image of the photoelastic isodynes in the plane of measurement within the plate 1, when the scanner 2 scans the said plane of measurement; the image recorder or the video-electronic storage device 5 records photographically or stores video-electronically the image of photoelastic isodynes produced by the selected light sheets which are scattered from the primary light beam 20 scanning the plane of measurement within the plate 1; the isodyne image processor 6 retrieves electronically from the recorded or stored isodyne fields values of all stress components related to particular planes of measurement using suitable software.

Referring to FIG. 2, in the majority of practical cases the photoelastic isodynes are identical to the plane elastic isodynes or differential elastic isodynes and therefore yield either the values of all the components of the plane stress fields or the values of the major components of the three-dimensional stress fields in plates.

Referring to FIG. 3, the scanning method of producing photoelastic isodynes by means of a single laser beam and by means of the isodyne collector is explained; a very narrow primary light beam 20, linearly or circularly polarized, propagates in the characteristic direction within the measurement plane which is parallel to the face of an immobile birefringent plate; the measurement plane is identical to the theoretical characteristic plane of the isodyne field and represents the object plane of the complete image-producing system; the said primary light beam 20 is displaced with a constant velocity or stepwise within the characteristic plane, in a direction normal to the characteristic direction which is given by the direction of propagation of the primary light beam 20, producing a linear scanning of the measurement plane; the isodyne collector 9 with the light sheet selector 10, which together with the laser producing the said primary light beam form a scanner, are displaced in the plane of measurement by a suitable driving unit; the selecting lens 3, the imaging optic 4 and the image recorder 5 are mechanically coupled with the said birefringent plate 1: their relative positions do not change during the linear scanning process; this arrangement produces in the image plane an image of photoelastic isodynes related to the plane of measurement and to the characteristic direction when the said light beam scans the measurement plane, being the characteristic plane, in the said manner. The lines of constant light intensity in the image plane represent the photoelastic isodynes.

Figure 4:
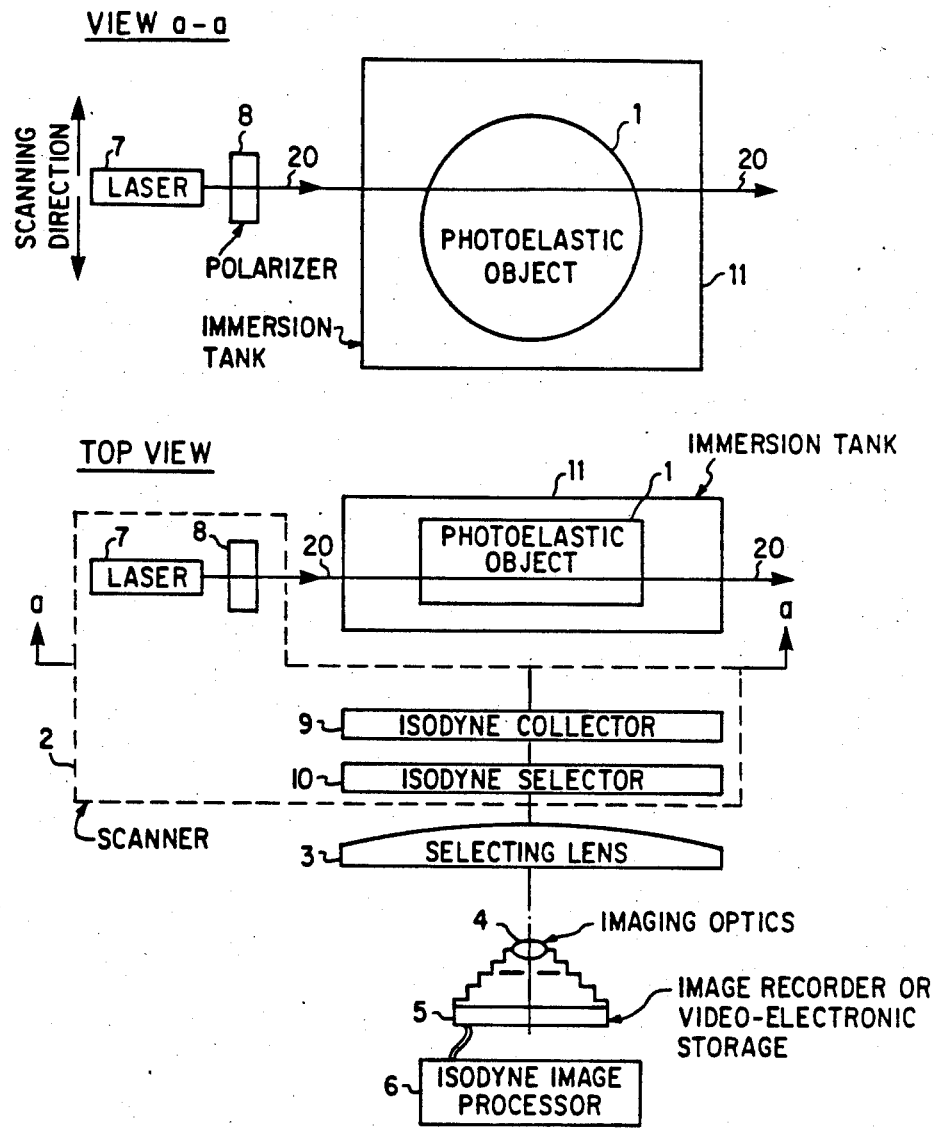
FIG. 4 is a scheme of the isodyne polariscope showing the major components of the apparatus and principle of operation.

FIG. 4 is a schematic diagram showing a view of a preferred embodiment of the opto-mechanical-electronic apparatus for the determination of elastic isodynes and of general state of birefringence in photoelastic objects whole field-wise, and subsequently, for the determination of related stress components in the said photoelastic objects, called isodyne polariscope. In addition to the components shown in FIG. 1 and FIG. 3, FIG. 4 shows an immersion tank 11 for the photoelastic objects having an arbitrary shape of the boundary; the immersion liquid contained in the immersion tank assures that the original direction of the primary light beam 20 is preserved when the said primary beam enters the said photoelastic object 1. The image recorder 5 either produces images of the photoelastic isodyne fields within selected planes of measurement photographically or stores them using the video-electronic techniques.

The isodyne image processor 6 evaluates in the whole field of each measurement plane the quantities of interest such as: parameters of birefringence, normal and shear stress components, isochromatics field, isoclinics field, isopachics field, Airy stress function, boundary stress distribution, contact stresses, etc.

Although the invention has been described with a certain degree of particularly, it is understood that the present disclosure has been made only by way of example and that numerous changes in details of construction and the combination and arrangement of parts may be resorted to without departing from the spirit and the scope of the invention as hereinafter claimed.

While a preferred embodiment of the invention has been disclosed, obviously modifications can be made therein without departing from the scope of the invention as defined in the following claims:

I claim:

1. Apparatus for the determination of elastic isodynes, photoelastic isodynes, and of general and particular states of optical anisotropy, in solid and liquid birefringent bodies, comprising: (1) a source of radiant energy producing a single narrow collimated radiation beam called the primary light beam; (2) means to circularly or linearly polarize and adjust the plane of vibration of the said primary light beam; (3) means to guide the said primary light beam into the said birefringent body along any selected direction and at any position; (4) means for selecting sheets of radiant energy consisting of light beams scattered in the said birefringent body along the path of the said primary light beam in directions close to normal to the said primary light beam at each scattering point and inclined to the plane of measurement at such angles that the intensities of the said scattered light beams carry directly optimal information on the state of optical anisotropy (birefringence) at the said scattering points in the said body; (5) means for isolation of a single sheet of scattered light; (6) means for secondary selecting and focusing of selected sheets of scattered light which transmits and focuses only those scattered light beams within particular light sheets which are scattered in the direction normal to the line of measurement; (7) means for optical noise reduction in the selected light sheets, which eliminates the background noise and transmits only those light beams which are scattered perpendicularly from the primary light beam, and which are focused by the means for secondary selecting; (8) means for producing real images of the distribution of the scattered light intensities along the path of the primary light beam within the plane of measurement using any of the said scattered light sheets, the optic axis of which is perpendicular both to the measurement plane and to the image plane; (9) means for recording or storing the said images of the light intensity distribution along the path of the primary light beam produced by the selected scattered light sheet when the primary light beam scans the plane of measurement and produces the image of the isodyne field; (10) means for electronic numerical processing and evaluation of information supplied by the recorded light intensity distribution at the plane of measurement, called isodyne image processor; (11) means for positioning and continuous displacing in horizontal and vertical directions the isodyne scanner, consisting of the mechanically and optically connected means (1) to (5), called driving unit; (12) means to eliminate refraction of the primary beam at the boundary of the object being investigated, called immersion tank.

2. The apparatus of claim 1 in which the radiant energy is light from a laser in the ultra violet, or visible, or infrared bands.

3. The apparatus of claim 1 in which the radiant energy is in the microwave band.

4. The apparatus of claim 1 in which the isodyne scanner is rigidly connected with the light source, e.g., a laser.

5. The apparatus of claim 1 in which the light source is immobile and is connected optically with the isodyne scanner by means of a set of reflecting surfaces.

6. The apparatus of claim 5 in which the reflecting surfaces which connect the light source with the isodyne scanner are made in such a manner that they act as reflective phase retarders for selected spectral frequencies of radiation to optimize the signal/noise ratio.

7. The apparatus of claim 1 in which the said driving unit of the isodyne scanner displaces step-wise the said primary light beam within the measurement plane.

8. The apparatus of claim 1 in which the said driving unit displaces the said primary light beam in two mutually perpendicular planes of measurement with a constant velocity.

* * * * *